(No Model.) 2 Sheets—Sheet 1.
F. M. EWERS.
WIRE STRETCHER.
No. 320,433. Patented June 16, 1885.
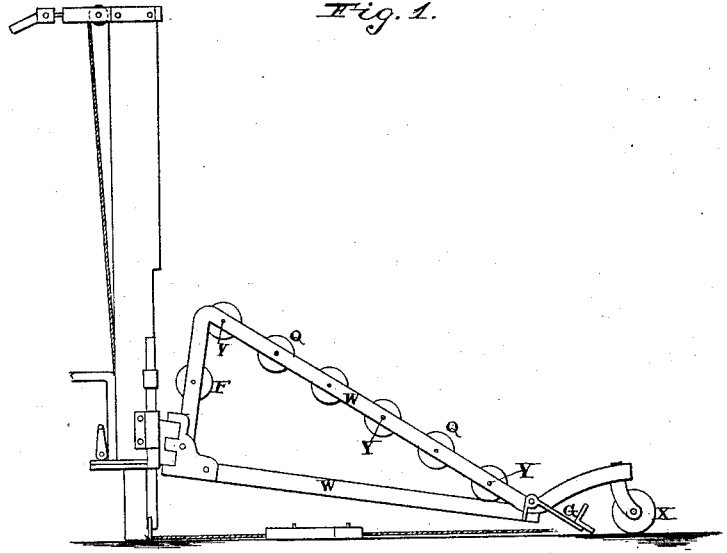
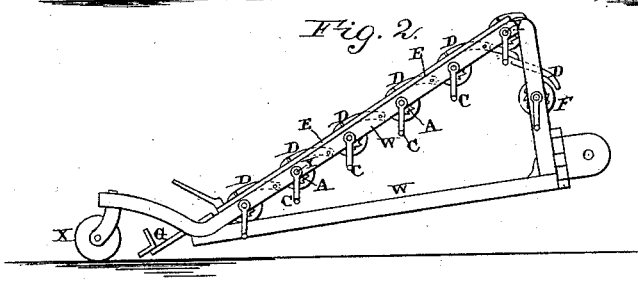
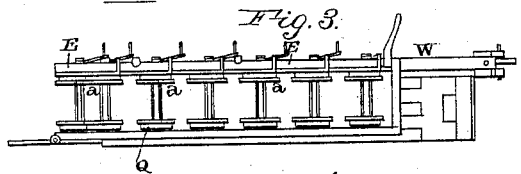
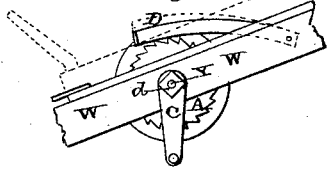
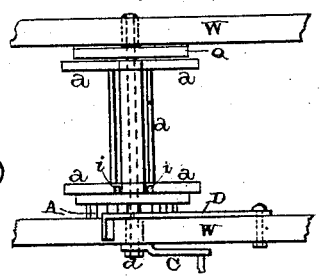
WITNESSES
INVENTOR
F. M. Ewers
per F. A. Lehmann,
Attorney (No Model.) 2 Sheets—Sheet 2.
F. M. EWERS.
WIRE STRETCHER.
No. 320,433. Patented June 16, 1885.
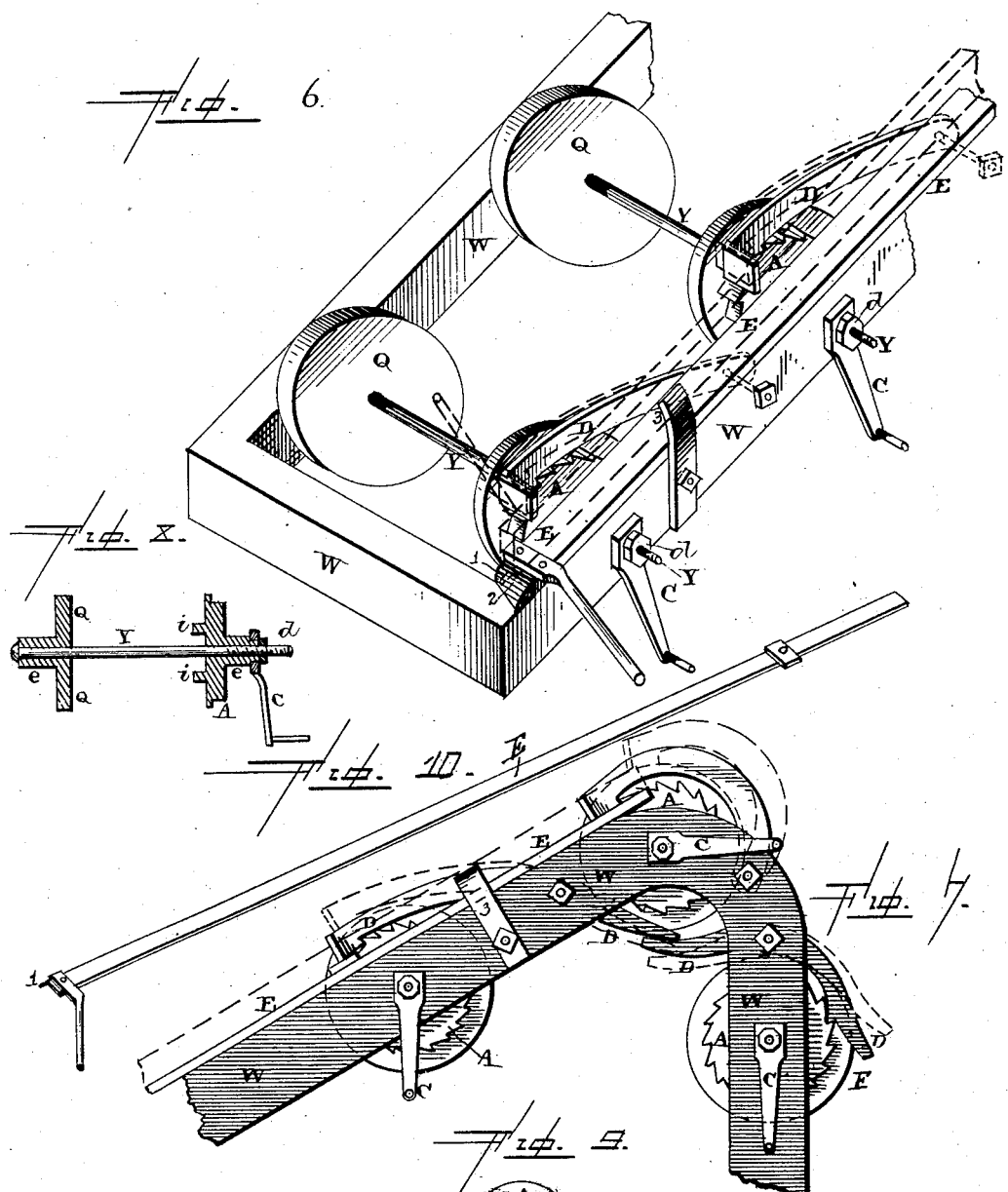
Witnesses.
L. F. Gardner
Jno. En. Prosperi.
Inventor.
F. M. Ewers
per F. A. Lehmann,
atty.

UNITED STATES PATENT OFFICE.

FRANCIS M. EWERS, OF EDISON, OHIO.

WIRE-STRETCHER.

SPECIFICATION forming part of Letters Patent No. 320,433, dated June 16, 1885.

Application filed November 18, 1884. (No model.)

*To all whom it may concern:*

Be it known that I, FRANCIS M. EWERS, of Edison, in the county of Morrow and State of Ohio, have invented certain new and useful Improvements in Wire-Stretchers; and I do hereby declare the following to be a full, clear, and exact description of the invention, such as will enable others skilled in the art to which it pertains to make and use it, reference being had to the accompanying drawings, which form part of this specification.

My invention relates to an improvement in machines for stretching wires for wire-fences; and it consists in the combination of a suitable inclined frame, which is supported at one end by the machine for driving the posts, or any suitable vehicle, and at its rear or lower end by means of a small wheel, the rods which are passed through the frame, and upon which the reels are placed, the disks and ratchets, which are placed upon the rods, and between which the reels or spools are placed, the pawls and the rod for operating the pawls, all of which will be more fully described hereinafter.

The object of my invention is to provide a machine which is to be used in connection with a post-driving machine, for the purpose of stretching the wires which are to form the fence as rapidly as the posts are driven, or which can be used separately to stretch the wires only while attached to the rear end of a vehicle of any suitable kind.

Figures 1 and 2 are side elevations of a machine embodying my invention, taken from opposite sides. Fig. 3 is a plan view. Figs. 4, 5, 6, 7, 8, 9 are detail views. Fig. 10 is a detail view of the pivoted bar.

W represents a triangular inclined frame, which is pivoted at its front end to a machine for driving fence-posts, or to any other suitable vehicle. The rear or lower end of the frame is supported by means of a caster-wheel, X, which runs along upon the ground. In this frame are placed the rods Y, which extend across the frame at suitable distances apart, and upon which are placed the disks $q$ at one end and the ratchet-wheels A at the other. These rods Y have heads upon one end so as to prevent the rods from becoming displaced, and are screw-threaded upon the other end so as to receive the nuts $d$. The disks Q and ratchets A are provided with hubs $e$ upon their outer sides, which hubs project through openings made in opposite sides of the frame W. The rods Y must be partially or wholly withdrawn from the ratchets and disks before the spools $a$, holding the wire, can be placed in position. Each ratchet is provided with projections $i$ on its face and with a crank on the outside of the frame, which crank is held in place by means of a nut on the rod. The projections $i$ on the inner sides of the ratchets A catch between the edges of the cross-pieces at one end of the reels, and thus prevent the reels from revolving, except when the ratchets revolve with them. The spools $a$, upon which the wires are wound, are placed upon the rods, and clamped between the ratchet-wheels and disks by means of the nuts on the rods. To one end of each of the rods Y are connected suitable cranks or tightening devices C, which devices cause the ratchet-wheels to revolve. The cranks C are applied to the ends of the hubs $e$ on the ratchets and do not come in contact with the rods Y, thus leaving the rods free to be moved endwise by the nuts for the purpose of clamping the reels between the disks and ratchets. By tightening the nuts $d$ on the end of the rods outside of the cranks the disks can be drawn towards the ratchet-wheels A, and thus each spool clamped rigidly in place.

Pivoted to the frame W are a suitable number of pawls, D, which engage with the ratchet-wheels and prevent them from turning backward while the machine is standing still, or when it is not desired to reel out the wire. In order to operate all these pawls at the same time, a pivoted bar, E, is placed upon the top of the frame, and by turning this bar up on edge it will catch under the turned-out ends of all the pawls, and thus raise them upward, with the exception of that engaging the ratchet of the reel F, which is placed at the inner end of the frame. This rod E is held in position upon the top edge of the frame W by the pivot 1, upon its lower end, which catches in a corresponding socket, 2, made to receive it, as shown in Figs. 6 and 10. The rod E is further held in position by the guards 3, secured to the outer side of the frame, which extend up above the frame, as shown in Figs. 6 and 7, for the purpose of preventing the rod from moving laterally. The pawl of this reel F is operated by the pawl of one of the reels above it, as shown in Figs. 2 and 4. Upon this reel F is intended to be placed a smooth wire. As the machine is driven along, the bar E is turned up on edge so as to release all the pawls, and thus the wires from all the reels will unwind. When it is desired to stretch the wires at any point, it is only necessary to turn down the bar E, when the pawls will again engage with the ratchet-wheels and prevent the spools from unwinding, and then the forward draft of the machine can be applied to stretching the wires. In case it is not desired to stretch the wires by the forward movement of the machine, they can be stretched to any desired extent by the cranks C. Loosely connected to the rear end of the frame is the stop G, which acts to prevent any backward movement of the machine. This stop acts by catching against the ground, and is intended to operate in connection with a larger stop hung upon the vehicle to which the machine is attached, for the purpose of preventing the power which is applied in stretching the wires from moving the machine backward.

Having thus described my invention, I claim—

The combination of the inclined frame which is supported at one end by a wheel, the rods which are passed through the frame, the disks and ratchets which are placed upon the rods and between which the spools are held, the pawls, and the rod for operating the pawls, substantially as shown.

In testimony whereof I affix my signature in presence of two witnesses.

FRANCIS M. EWERS.

Witnesses:
AMMON M. EWERS,
O. R. REYNOLDS.